3,761,446
HALOGENATED ARYLAMINE EPOXY
CURING AGENTS
Anthony C. Soldatos, Kendall Park, N.J., assignor to
Union Carbide Corporation, New York, N.Y.
No Drawing. Filed May 5, 1972, Ser. No. 250,584
Int. Cl. C08g 30/14
U.S. Cl. 260—47 EN                            10 Claims

ABSTRACT OF THE DISCLOSURE

Halogenated arylamines prepared from p-aminophenol and halogenated aromatic hydrocarbons serve as unique curing agents for bis(2,3-epoxycyclopentyl)ether as well as curable copolymers of bis(2,3-epoxycyclopentyl)ether with a polyol. The resultant cured epoxy resins have not only enhanced heat distortion temperatures, and reduced flammabilities but enhanced resistance to water as well.

BACKGROUND OF THE INVENTION

This invention pertains to bis(2,3-epoxycyclopentyl) ether and curable copolymers of bis(2,3 - epoxycyclopentyl)ether with polyols and more particularly to such epoxy compounds cured with halogenated arylamines derived from p-aminophenol and halogenated aromatic hydrocarbons.

Copolymers of bis(2,3 - epoxycyclopentyl)ether and polyols have been shown to cure to resins having excellent compressive, flexural and tensile cast properties (A. S. Soldatos and A. S. Burhans, Industrial and Engineering Chemistry, vol. 5, pp. 205–209, 1967) with conventional primary amine curing agents such as metaphenylenediamine.

SUMMARY OF THE INVENTION

It has now been found that bis(2,3-epoxycyclopentyl) ether and copolymers of bis(2,3-epoxycyclopentyl)ether and polyols can be cured to non-flammable solid resins having enhanced heat distortion temperatures and resistance to water by curing them with curing amounts of halogenated arylamines having the formula:

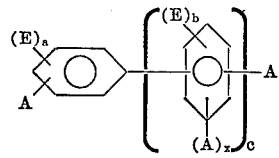

wherein E is a halogen radical selected from the group consisting of —F, —Cl, and —Br;

$a$ is an integer having values of 1 to 4;
$b$ is an integer having values of 1 to 3;
$c$ is an integer having values of 0 to 3;
A is

$x$ is an integer having values of 0 to 1.

DESCRIPTION OF THE INVENTION

Bis(2,3-epoxycyclopentyl)ether is commercially available from Union Carbide Corporation identified as ERNA–4205.

The preparation of the copolymers of bis(2,3-epoxycyclopentyl)ether and polyols is disclosed in the reference of Soldatos et al. given supra and in U.S. 3,398,102 and is commercially available as ERLA–4617 from Union Carbide Corporation.

The preferred polyols used to make the copolymers used in this invention are dihydric glycols such as those having the formula:

$$HO(C_nH_{2n}O)_xH$$

wherein $n$ has a value of 2 to 20 inclusive, preferably from 2 to 6 inclusive and $x$ has a value of 1 to 70 inclusive, preferably 1 to 10 inclusive. Among suitable glycols which can be used are ethylene glycol, diethylene glycol, 1,2-propanediol, 1,4-butanediol, 1,10-decanediol, polyethylene glycol), poly(1,2-propanediol) and the like. Also suitable are the commercially available glycols marketed under the trade name "Carbowax," such as poly(ethylene glycol) and poly(propylene glycol) having an average molecular weight of about 300 to about 700.

Other suitable polyols marketed under the trade name "NIAX Polyols" which are poly(propylene glycol) or mixed propylene glycol-ethylene glycol copolymers having molecular weights of about 700 to about 6,000.

The halogenated arylamines used as the curing agents in this invention can be prepared by condensing the sodium salt of p-aminophenol with an equivalent amount of a halogenated aromatic hydrocarbon containing at least two halogen groups, preferably chloro groups. The preferred halogenated aromatic hydrocarbons are hexachlorobenzene and chlorinated polyphenyls commercially available under the trademark "Aroclor" from Monsanto Company. For example three moles of sodium p-aminophenolate can be condensed with a 60% by weight chlorinated terphenyl (such as Aroclor 5460) in a highly polar solvent such as dimethylsulfoxide, dimethylformamide, of N-methylpyrrolidinone followed by recovery of the product by coagulation. This combination of reactants has afforded a product with a titrated amine equivalent weight of 281. Three products were identified by mass spectrometry, one a diamine and the two other product triamines. Other readily available polychlorinated benzene reactants which can be used include Aroclor 1242 (42% chlorinated biphenyl and Aroclor 1254 (54% chlorinated biphenyl), and Aroclor 4565 (65% chlorinated terphenyl).

The curing temperature is not narrowly critical and will depend on and vary with the exact formulation of the composition being cured. As a general rule, this temperature is in the range of about 80° C. to about 200° C. for a period of time ranging from about 1 to about 21 hours. As is known by those skilled in the art it is usually preferred to use a curing cycle comprising one or more temperature levels for varying lengths of time.

The amount of curing agent is also not narrowly critical but will depend on the degree of cure desired and will vary with the exact formulation of the composition being cured. It is preferred to employ about 70 to about 220 parts of arylamine per hundred parts of bis(2,3-epoxycyclopentyl)ether or copolymer thereof although a range of about 100 to about 200 parts of arylamine can also be used.

It is prefered for reasons of economy to effect the cure of the instant compositions at atmospheric pressure although superatmospheric as well as subatmospheric pressures can also be used if so desired.

The evaluations of the cured products of this invention were carried out by means of the following tests.

Heat Distortion Temperature (HDT) was measured in accordance with ASTM D 1648.

Water Resistance was measured by determining the percent increase in weight of cured test specimens measuring ½" x ½" x 1" after immersion in water at room temperature and boiling water for varying lengths of time.

Flammability was determined in accordance with ASTM D635.

The products obtained by curing bis(2,3-epoxycyclopentyl)ether and the copolymer of bis(2,3-epoxycyclopentyl)ether with polyols with the halogenated arylamines disclosed herein can be used as binders in the production of structural and filament wound structures. In preparing such binders, the mixture of epoxy compound and arylamine is dissolved in a suitable organic solvent to form a solution having a solids content of about 30 to about 70 percent by weight. As a rule, the organic solvent used is a ketone, such as methyl ethyl ketone, diisopropyl ketone or an aromatic hydrocarbon, such as toluene and the like. This solution is then used to impregnate, by any suitable method, for example, dipping, spraying and the like, any desired material, for instance, glass cloth, glass filaments, boron filaments, carbon cloth, carbon filaments, nylon filaments, metal fibers, paper and the like. The solvent is removed from the impregnated material and the impregnated material is stored on a spool and subsequently formed into a desired shape and the composition cured products can also be used as potting compounds, adhesives, coatings, for the fabrication of sundry shaped articles and castings such as, covers for housings for machinery parts, radio receivers, and the like and for the encapsulation of electrical and other components.

The invention is further described in the examples which follow. All parts and percentages are by weight unless otherwise specified.

Example 1

(A) An aryltriamine having the gross structural formula $C_{18}H_{4.7}Cl_{6.3}(OC_6H_4NH_2)_3$, a melting point of 120–137° C. and an amine equivalent weight of 269 g./—$NH_2$ was first prepared as follows.

To a 5 liter, 4 neck flask equipped with a Barrett tube, condenser, nitrogen inlet tube and thermometer was added 275 grams (2.52 mole) of p-aminophenol and 930 ml. of dimethylsulfoxide. The system was purged with nitrogen and 201.8 grams (2.48 mole) of 49.15% aqueous sodium hydroxide added. The solution was heated to 110–120° C. and water removed via the toluene/water azeotrope. After complete dehydration (approximately 5 hours), toluene was removed until the pot temperature reached 135° C.

A concentrated solution of 438.4 g. of Aroclor 5460 (0.8 mole) in 300 ml. of hot toluene was added via an additional funnel. The remaining toluene was then distilled off and the pot heated to 160° C. and maintained 1 hour before cooling to room temperature.

At room temperature, the reaction mixture was vacuum filtered to remove sodium chloride and coagulated. Coagulation was accomplished by pouring the filtrate slowly into distilled water (1 to 10 parts of water) contained in a 3 liter blender and stirred at a high speed. Vacuum filtration through a fritted glass funnel afforded a dark colored triamine. The triamine was washed further with distilled water, then dried at 60° C. under vacuum.

The dried triamine (93% yield) was dark brown in color.

(B) Next a copolymer of bis(2,3-epoxycyclopentyl) ether and ethylene glycol was prepared as follows.

Into a 5 liter flask, equipped with an agitator, reflux condenser and thermometer, was charged 2090 grams (11 moles) of bis(2,3-epoxycyclopentyl)ether, 341 grams (5.5 moles) of ethylene glycol and 81.5 grams of N,N-dimethylbenzylamine (3.0 percent by weight based on the weight of bis(2,3-epoxycyclopentyl)ether. The reaction mixture was maintained at a temperature of 120° C. for 6 hours and then distilled up to a pot temperature of 145° C., under a pressure of 7 mm. Hg. The curable, tacky copolymer recovered had an epoxide equivalent weight in the range of 110–120 grams/gram mole.

Then test specimens measuring ½" x ½" x 1" were prepared by admixing 117.0 grams of the aryltriamine prepared as described in paragraph (A) above with 100 grams of the copolymer of bis(2,3-epoxycyclopentyl) ether with ethylene glycol prepared as described in paragraph (B) above in a form and curing according to the following heating cycle:

(1) 4 hours at 100° C.
(2) 2 hours at 160° C.

The heat distortion temperature (HDT) of the test specimens was 194° C.

The resistance of the cured product to water was demonstrated by immersing test specimens prepared as above for 40 weeks in water at room temperature. The percent increase in weight was 1.0.

When tested for flammability the test specimens were found to be non-flammable.

CONTROL A

Example 1 was repeated with the exception that 24 grams of m-phenylene diamine was substituted as the curing agent for the aryltriamine described in paragraph A curing 100 grams of the copolymer of bis(2,3-epoxypentyl)ether and ethylene glycol. This weight of m-phenylene diamine is the amine equivalent of the aryltriamine used in Example 1.

The heat distortion temperature of the test specimens was found to be 175° C.

The percent increase in weight after immersion of specimens in water at room temperature for 40 days was 2.0.

Specimens subjected to the flammability test were found to be flammable.

Example 2

When Example 1 is repeated with the exception that the copolymer of bis(2,3-epoxycyclopentyl)ether and ethylene glycol is replaced by bis(2,3-epoxycyclopentyl)ether alone, a cured product having comparable properties is obtained.

Example 3

An aryldiamine having the idealized structural formula

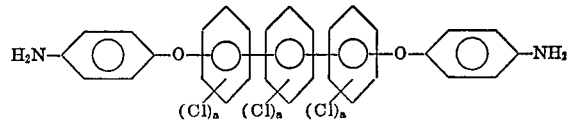

(wherein $a$ has a value of about 1 to 4), a melting point of 102–120° C. and an amine equivalent weight of 367 grams/—$NH_2$ containing about 37% by weight of chlorine was first prepared as follows:

A 2 liter, 4 neck flask equipped with a thermometer, nitrogen purge, mechanical stirred, condenser and Barrett tube was charged with:

| | | |
|---|---|---|
| p-Aminophenol (1.355 mole) | g | 147.8 |
| Aroclor 5460 (0.65 mole) | g | 375.8 |
| Toluene | ml | 625 |
| Dimethylsulfoxide | ml | 625 |

The mixture was sparged with nitrogen and heated to reflux, 108.25 g. 49.23% sodium hydroxide solution (1.33 mole) was added over a one hour period while concurrently removing the water via the toluene H₂O azeotrope.

Dehydration was completed in two hours and then followed by the removal of the toluene until the pot temperature reached 165° C. The solution was stirred for one hour at 165° C., cooled and the product isolated via coagulation in a 10:1 volume ratio of water containing 0.2% sodium hydroxide and 1% sodium sulfite. After slurrying the filtered product in fresh water, the "diamine" was recovered by filtration and dried at 70° C. under vacuum.

Then cylindrical test specimens measuring ½" x ½" x 1" were prepared by admixing 162 grams of the aryldiamine prepared as described above with 100 grams of the copolymer of bis(2,3-epoxycyclopentyl)ether with ethylene glycol prepared as described in paragraph B of Example 1 in a form and curing according to the following heating cycle:

(1) 3 hours at 100° C.
(2) 2 hours at 120° C.
(3) 16 hours at 190° C.

Test specimens were immersed in boiling water for 35 days. The percent increase in weight after this period of exposure was found to be 3.73.

Example 4

Example 1 was repeated with the exception that 15.0 grams of epoxyether copolymer was cured with 17.6 grams of aryltriamine according to the following heat cycle:

(1) 3 hours at 100° C.
(2) 2 hours at 120° C.
(3) 16 hours at 190° C.

The test specimens after immersion in water at room temperature for 24 weeks showed an increase in weight of 2.01%. Test specimens immersed in boiling water for 35 days showed an increase in weight of 4.49%.

CONTROL B

Example 4 was repeated with the exception that 50.1 grams of the epoxy copolymer were cured with 12.3 grams of m-phenylenediamine. Test specimens of this combination showed an increase in weight after 24 weeks in water at room temperature of 4.6% and after 35 days in boiling water of 10.29%.

CONTROL C

Example 4 was repeated with the exception that 50.1 grams of the epoxy copolymer were cured with 23.0 grams of methylene dianiline. The increase in weight of the test specimens after 24 weeks in water at room temperature was 3.36% and after 35 days in boiling water was 6.87%.

CONTROL D

Example 4 was repeated with the exception that 50.2 grams of epoxy copolymer were cured with 10.85 grams of Furane Hardener 9231 (a polymeric aromatic amine epoxy hardener sold by Furane Plastics Inc., Los Angeles, Calif.). The increase in weight of test specimens after 24 weeks in water at room temperature was 5.17% and after 35 days in boiling water was 11.55%.

CONTROL E

Example 4 was repeated with the exception that 50.1 grams of the epoxy copolymer were cured with a mixture of 12.3 grams of m-phenylenediamine and 0.75 gram of boron trifluoride monoethylamine. The increase in weight of test specimens after 24 weeks in water at room temperature was 6.02% and after 35 days in boiling water was 11.39%.

CONTROL F

Example 4 was repeated with the exception that 50.1 grams of the epoxy copolymer were cured with a mixture of 23.0 grams of methylenedianiline and 0.75 gram of boron trifluoride monoethylamine. The increase in weight of test specimens after 24 weeks in water at room temperature was 3.38% and after 35 days in boiling water was 7.64%.

CONTROL G

Example 4 was repeated with the exception that 50.2 grams of the epoxy copolymer were cured with a mixture of 10.85 grams of Furane Hardener 9231 and 0.75 gram of boron trifluoride monoethylamine. The increase in weight of test specimens after 24 weeks in water at room temperature was 6.27% and after 35 days in boiling water was 11.27%.

Although the invention has been described in its preferred forms with a certain degree of particularity, it is understood that the present disclosure of the preferred forms has been made only by way of example and that numerous changes may be resorted to without departing from the spirit and the scope of the invention.

What is claimed is:

1. Curable compositions comprising bis(2,3-epoxycyclopentyl)ether and a curing amount of a halogenated arylamine having the formula:

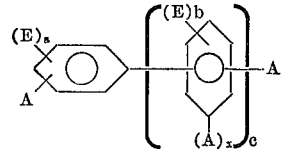

wherein:

E is a halogen radical selected from the group consisting of —F, Cl, and —Br;
$a$ is an integer having values of 1 to 4;
$b$ is an integer having values of 1 to 3;
$c$ is an integer having values of 0 to 3;
A is

$x$ is an integer having values of 0 to 1.

2. Curable compositions comprising a copolymer of bis(2,3-epoxycyclopentyl)ether with a polyol and a curing amount of a halogenated arylamine having the formula:

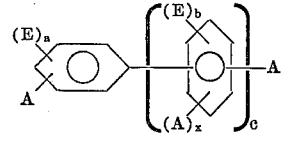

wherein:

E is a halogen radical selected from the group consisting of —F, Cl, and —Br;
$a$ is an integer having values of 1 to 4;
$b$ is an integer having values of 1 to 3;
$c$ is an integer having values of 0 to 3;
A is

$x$ is an integer having values of 0 to 1.

3. Composition claimed in claim 1 wherein E is —Cl.
4. Composition claimed in claim 3 wherein $c$ is 0.
5. Composition claimed in claim 3 wherein $c$ is 1.
6. Composition claimed in claim 3 wherein $c$ is 2 and $x$ is 1.
7. Composition claimed in claim 3 wherein $c$ is 2.
8. Composition claimed in claim 3 wherein $c$ is 4.
9. Composition claimed in claim 2 wherein the polyol is ethylene glycol.
10. Composition claimed in claim 9 wherein E is —Cl and $c$ is 2.

References Cited

UNITED STATES PATENTS

| | | | |
|---|---|---|---|
| 3,308,158 | 3/1967 | Szobel et al. | 260—570.5 |
| 3,342,918 | 9/1967 | Welch et al. | 264—134 |
| 3,398,102 | 8/1968 | Soldatos et al. | 260—2 |

WILLIAM H. SHORT, Primary Examiner

E. A. NIELSEN, Assistant Examiner

U.S. Cl. X.R.

260—2 N